United States Patent [19]

Imao

[11] Patent Number: 4,819,193
[45] Date of Patent: Apr. 4, 1989

[54] GRADATION PROCESSING METHOD FOR COLOR IMAGES

[75] Inventor: Kaoru Imao, Kawasaki, Japan

[73] Assignee: Ricoh Company, Ltd., Tokyo, Japan

[21] Appl. No.: 799,722

[22] Filed: Nov. 18, 1985

[30] Foreign Application Priority Data

Nov. 19, 1984 [JP] Japan .................................. 59-243979
Dec. 11, 1984 [JP] Japan .................................. 59-261391

[51] Int. Cl.[4] ........................ H04N 1/387; G09G 1/00
[52] U.S. Cl. ...................................... 364/526; 358/80; 358/75
[58] Field of Search .................. 364/526; 358/332, 78, 358/80, 75; 340/703; 400/196.1

[56] References Cited

U.S. PATENT DOCUMENTS

| | | | |
|---|---|---|---|
| 4,438,453 | 3/1984 | Alston | 358/78 |
| 4,488,245 | 12/1984 | Dalke et al. | 364/526 |
| 4,488,245 | 12/1984 | Dalke et al. | 364/526 |
| 4,504,160 | 3/1985 | Payne et al. | 400/196.1 |
| 4,536,848 | 8/1985 | D'Entremont et al. | 364/526 |
| 4,636,844 | 1/1987 | Sasaki | 358/80 |
| 4,677,427 | 1/1987 | Komatsu et al. | 340/703 |

Primary Examiner—Parshotam S. Lall
Assistant Examiner—Ellis B. Ramirez
Attorney, Agent, or Firm—Mason, Fenwick & Lawrence

[57] ABSTRACT

Any desired screen angle is obtained through calculation for coordinate conversion. Since the screen angle can be set to any desired value for each color used in color recording, a moiré can be prevented. The memory capacity required for a memory constituting a threshold table is reduced. The interporation processing is performed to make small an error in calculations. The linear interporation method, the distance allocation method, cubic convolution, etc. are available. Data for respective values of R, G and B in association with the elements of masking equations used in determining Y, M and C, each element including the function of second or higher degrees, have been previously stored in the form of a table, and the respective data obtained by referring to the table with R, G and B as parameters are calculated to obtain Y, M and C.

7 Claims, 11 Drawing Sheets

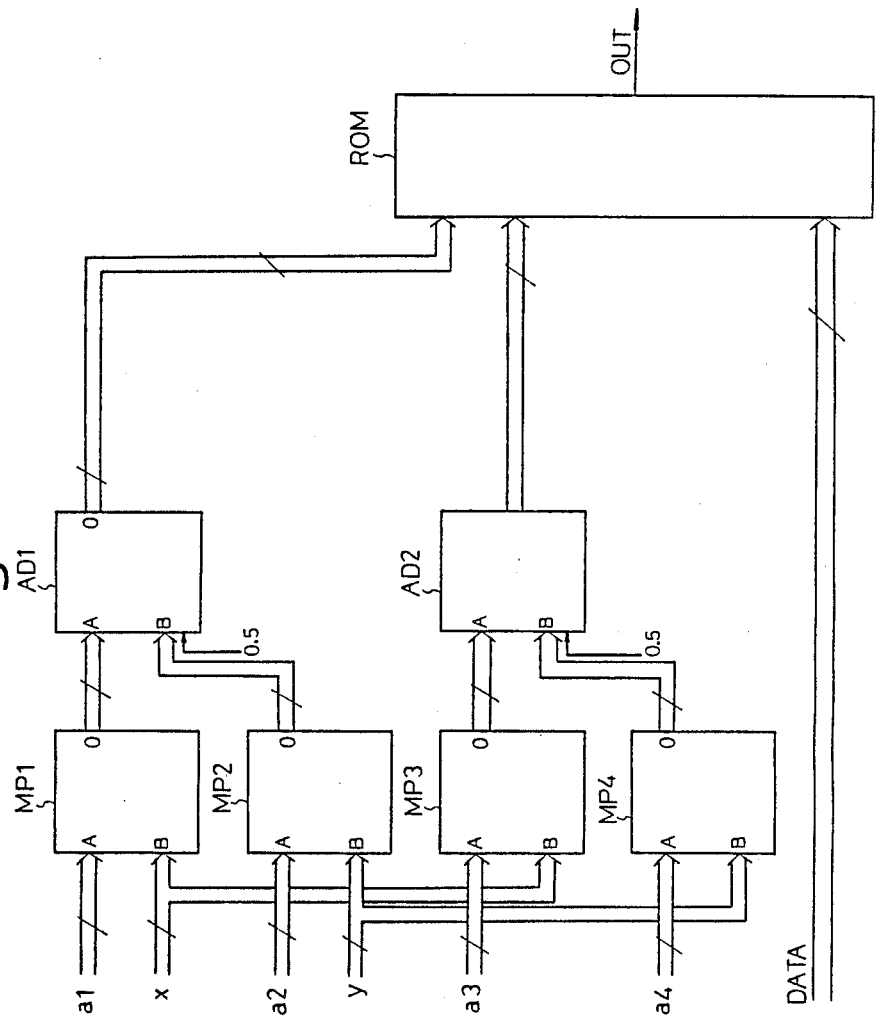

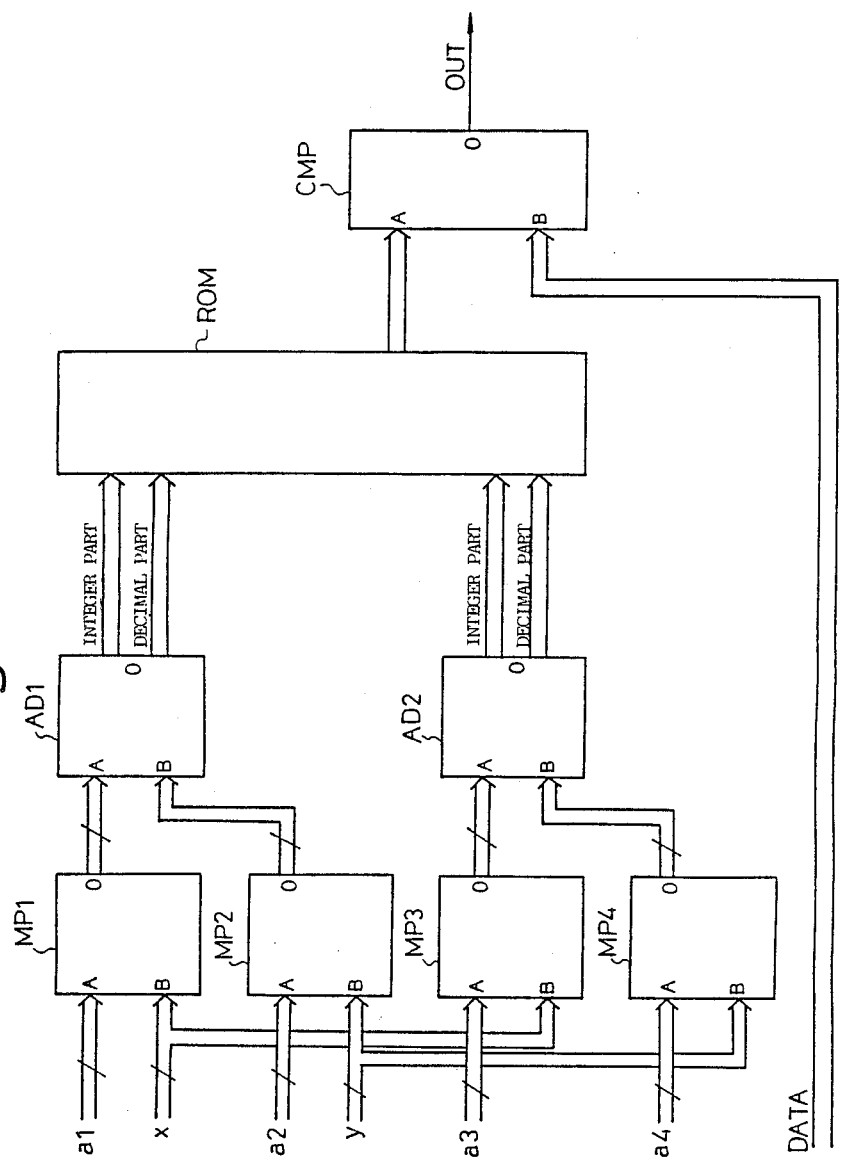

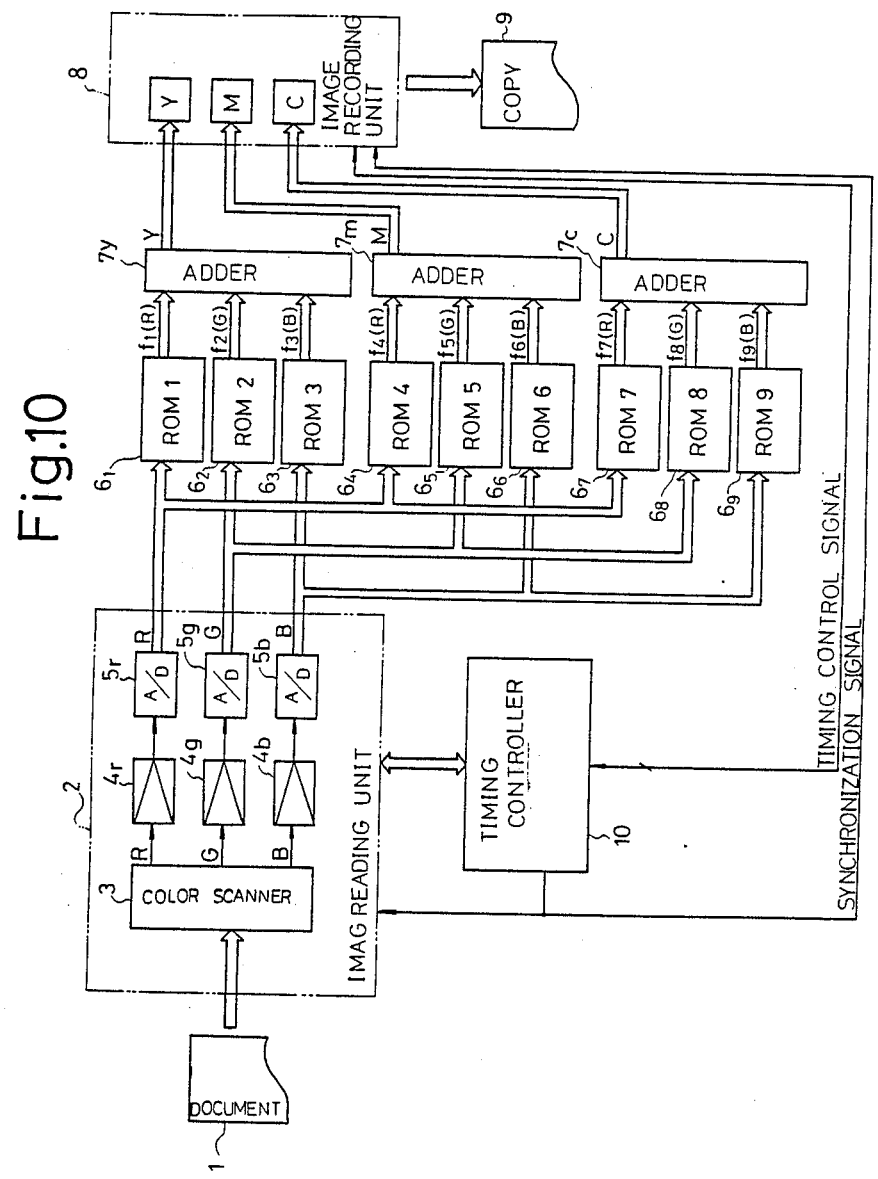

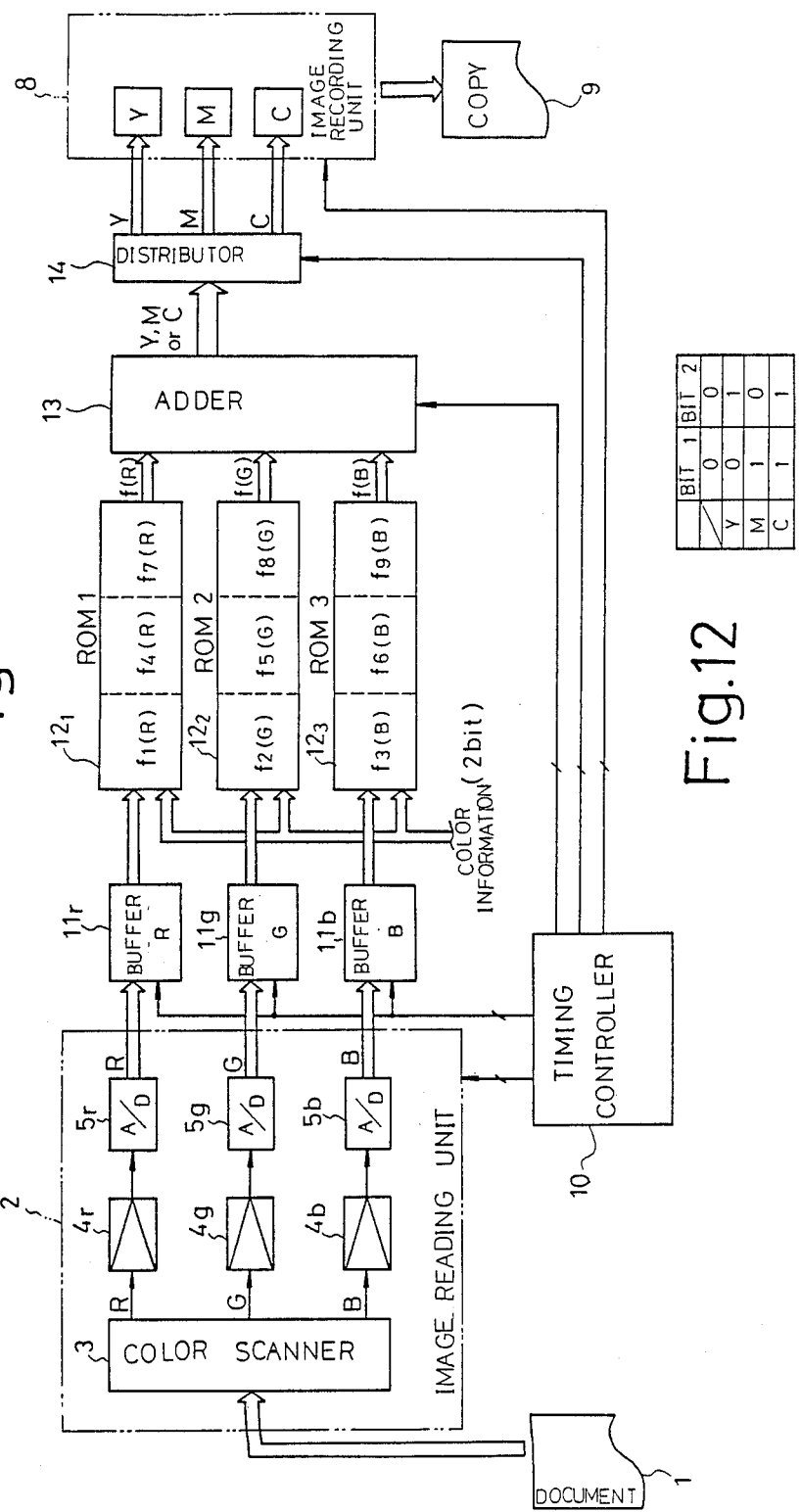

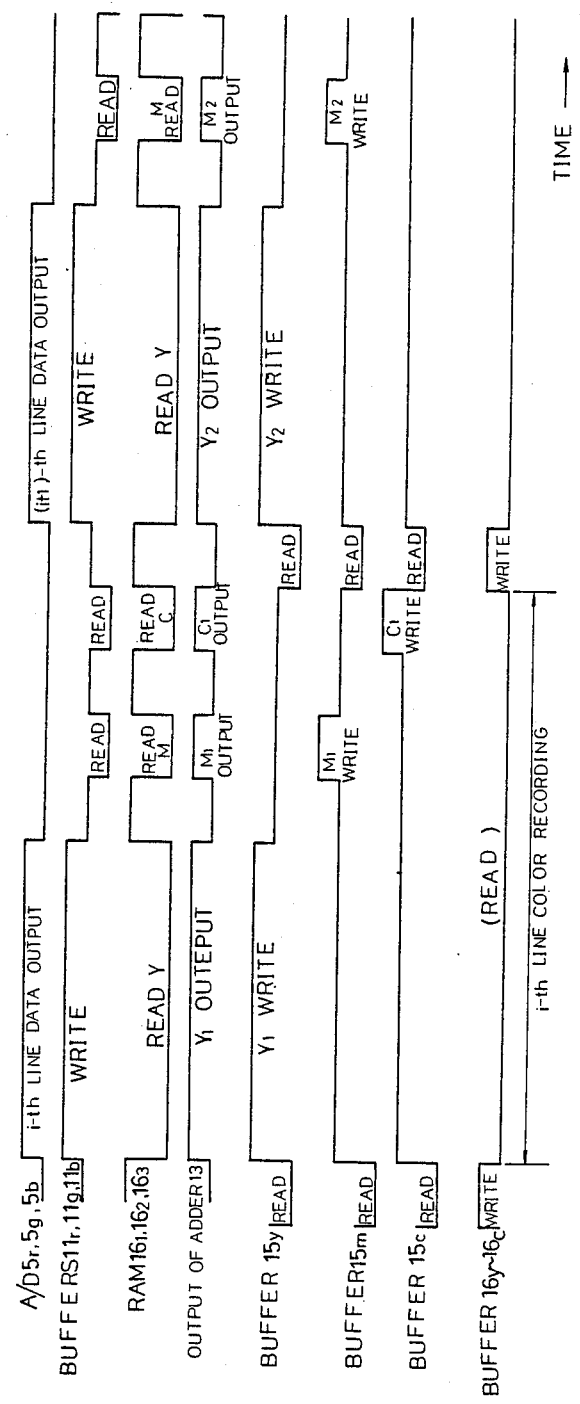

GRADATION PROCESSING METHOD FOR COLOR IMAGES

BACKGROUND OF THE INVENTION

The present invention relates to gradation processing for color images in which gradation image data including a plurality of colors is recorded by a color printer by way of example, and more particularly to forming of an effective screen angle when a plurality of picture elements are used to represent one gradation.

The present invention also relates to an information converting method for use in converting color component gradation information read by such as a color scanner to color component recording gradation information applied to information recording equipment such as a color printer.

Certain digital recording apparatus can only record a unit recording picture element in a binary manner; "recording" or "non-recording". When using this type of digital recording apparatus, gradation cannot be represented for each unit of picture element, but it can effectively be represented by making a plurality of recording picture elements correspondent to one gradation information. A dither method or a density pattern method has been frequently utilized to represent such gradation.

When gradation is converted to binary data, there must be made judgment on "recording:1" or "non-recording:0" with a certain threshold set as the border level. Variation in this threshold permits representation gradation. In other words, by allocating different thresholds from each other in their values to respective elements of a two-dimensional matrix in X rows and Y columns and then comparing the thresholds of the respective elements with one or different gradation picture element data for conversion of gradation data to binary recording data, it is possible to change the number of picture elements above the "recording" level, i.e., recording density, in accordance with gradation of the gradation picture element data for each plurality of recording picture elements corresponding to the two-dimensional matrix of thresholds.

In the dither method, one threshold in the matrix is allocated with respect to the data for one gradation picture element, and location of the selected threshold is updated every time the matrix everywhen location of the gradation picture element is changed. In the density pattern method, all the elements of the matrix are made correspondent to the data of one gradation picture element and, when one gradation picture element data is input, the thresholds are selected in sequence to produce recording picture element information in accordance with the number of elementsof the matrix.

Meanwhile, when color recording is effected using ink of plural colors, such as Y (yellow), M (magenta) and C (cyan) for example, there may occur a moire due to interference between recording images of different colors. Also, because the threshold matrix utilized in converting gradation data to binary data is repeatedly used for each of the predetermined picture elements, the array pattern of thresholds may be remarked in the recording image.

Further, when recording locations of ink of different colors are shifted from each other due to mechanical positioning errors, such a shift appears in a certain direction throughout the entire image, and the resulting color shift will appear continuous, loud and marked image in the form of line, for example.

Moreover, depending on picture elements, ink of different colors may be recorded on a single picture element in superimposed relation. Theoretically, mixing of the three primary colors Y, M and C can reproduce any desired colors. In practice, however, depending on whether or not ink of different colors are superimposed, and the order of superimposition thereof, the reproduced color is changed and hence turbidity is caused in the reproduced color in relation to such factors as the transparency of the ink.

In the field of printing, the above-mentioned disadvantages in color recording have been heretofore solved by inclining a reticulated plate with respect to recording paper for each color by a predetermined angle, to such an extent that the adverse recording will not be practically appreciated by eyes of human beings. This inclination is generally known as a screen angle.

However, such a screen angle cannot be set in digital image recording of dot matrix system.

Accordingly, there has been proposed a method of practically forming a screen angle by causing an array of thresholds in the threshold matrix to have an inclination. But, the conventional method has the small degree of freedom in setting a screen angle, and a memory of very large capacity must be prepared for the threshold value in order to finely set the screen angle.

Meanwhile, color component information read by a color scanner consists of red (R), green (G) and blue (B) and, in case of gradation processing, the information is rendered to a signal level or digital data corresponding to color components of an image. For color recording on the basis of such color component information, because the main recording colors are yellow (Y), magenta (M) and cyan (C), the read color component gradation information R, G and B are converted to recording color component gradation information Y, M and C.

In case of color image reproduction due to color ink recording, for example, such information conversion has been heretofore performed following the equations below, which are known as masking equations, to correct a spectroscopic characteristic of the ink:

$$Y = a11R + a12G + a13B$$

$$M = a21R + a22G + a23B$$

$$C = a31R + a32G + a33B$$

To compensate failure of proportion and addition rules of ink, it can be also envisaged to perform color correction using such as the following masking equations including terms of higher orders:

i
$$Y = a11R + a12G + a13B + a14RG + a15GB + a16BR + a17R^2 + a18G^2 + a19B^2$$

$$M = a21R + a22G + a23B + a24RG + a25GB + a26BR + a27R^2 + a28G^2 + a29B^2$$

$$C = a31R + a32G + a33B + a34RG + a35GB + a36BR + a37R^2 + a38G^2 + a39B^2$$

In the past, arithmetic operation following the masking equations has been implemented as to the simple masking equations of first degree and conceived as to the complex masking equations of second or higher degrees with the aid of (a) an analog circuit using an operational amplifier, (b) a computer to conduct the desired calculation, (c) a digital arithmetic circuit in combination with a multiplier or an adder, or (d) a look-up table memory-digital system with which Y, M and C are read out through accessing with R, G and B as parameters. The method of (a) has a high processing speed, but requires a number of operational amplifiers to implement the complex masking equations, thus resulting in a very complicated circuit configuration. The method of (b) employs a microprocessor to calculate the complex masking equations and hence a low processing speed. The method of (c) requires a number of expensive multipliers and hence must resort to a very complicated circuit configuration. Finally, with the method of (d), if 8 bits are allocated to each of R, G and B by way of example, there are needed memory addresses of $2^{24}$ and the memory capacity of $2^{24}$ (abut 16M) words, thus resulting in the enormous memory capacity to be required. As mentioned above, for conventional color information conversion, it is difficult to perform the masking equations for second or higher degrees.

SUMMARY OF THE INVENTION

A first object of the present invention is to enable the setting of any desired screen angle and improve the recording quality in gradation color recording without the need of a memory of large capacity.

A second ofject of the present invention is to perform higher accurate color information conversion with a relatively simple circuit configuration, and a third object thereof is to perform color information conversion following the masking equations of second or higher degrees with the aid of a memory of relatively small capacity.

To achieve the first object, according to the present invention, the screen angle is set through arithmetic operation of coordinate conversion. For example, while leaving an array of the threshold matrix as conventional, the coordinate values of picture element data to be processed are rendered to new ones through coordinate conversion in accordance with the screen angle and then referred to the threshold matrix, whereby the screen angle is effectively produced. Now referring to FIG. 3, consider an arbitrary cell Cxy on the x, y coordinates. Assuming that Uuv indicates the coordinate axis inclined with respect to the x, y coordinate axis Axy by a predtermined angle O, when the cell Cxy is rotated through the angle O to coincide with the coordinate axis Auv, the resulting coordinate values u, v of the new cell Cuv on the coordinate axis Axy are represented as follows, respectively:

$$u = S1 \cdot x0 \cdot \cos\theta + S2 \cdot y0 \cdot \sin\theta \quad (1)$$
$$= a1 \cdot x0 + a2 \cdot y0$$

$$v = S3 \cdot x0 \cdot \sin\theta + S4 \cdot y0 \cdot \cos\theta \quad (2)$$
$$= a3 \cdot x0 + a4 \cdot y0$$

where S1, S2, S3 and S4 are signs (+, −) determined in response to the angle $\theta$.

More specifically, by setting the above parameters a1, a2, a3 and a4 in accordance with the screen angle and then performing arithmetic operations of the above equations (1) and (2), the new coordinate values after coordinate conversion are determined which are then utilized to refer the threshold matrix (table), whereby the screen angle is produced. Accordingly, with the parameters a1–a4 set to different values for each color, the screen angle is changed for each color to solve the above-mentioned disadvantages similarly to the result effected in the field of printing.

In this connection, when performing calculations of coordinate conversion, the results are usually not in the form of integers, while the coordinate values are integers. When the threshold matrix is referred using only the integer part of the calculated result, there is a possibility of causing a relatively large error. In a preferred embodiment of the present invention, therefore, interpolation is carried out to reduce the size of the errors.

Further, to achieve the above second and third objects, in a preferred embodiment of the present invention, the recording gradation information for each color, is determined by the following equations below;

$$Y = f1(R) + f2(G) + f3(B),$$

$$M = f4(R) + f5(G) + f6(B),$$

and $$C = f7(R) + f8(G) + f9(B)$$

where f1(R), f2(G), ..., f9(B) are functions of second or higher degrees
calculation values of the functions f1(R), f2(G), ..., f9(B) for respective values in predicted ranges of parameters R, G and B are calculated in advance individually, and stored in memory means corresponding to the respective parameter values separately as to functions; and at the time of converting color information, the memory means is accessed with R, G and B as parameters to read the corresponding calculated values to thereby obtain Y from addition of the read calculated values of f1(R), f2(G) and f3(B), M from addition of the read calculated values of f4(R), f5(G) and f6(B), and C from addition of the read calculated values of f7(R), f8(G) and f9(B).

With this embodiment, if 8 bits are allocated to each of R, G and B, the resulting memory capacity is in order of $3 \times 2^8$ words which is remarkably smaller than the memory capacity of $2^{24}$ (aout 16M) to be necessary in the table look-up memory-digital system that has been envisaged in the past. Nevertheless, in additiion to the above memory, the embodiment requires only an addition using an arithmetic unit such as an adder or microprocessor. The adder is relatively cheap and does not so complicate the circuit configuration, while additive operation using the microprocessor will not provide a significant delay in the processing speed. It is, therefore, possible to perform high-accurate conversion of color information using the masking equations of second or higher degrees.

BRIEF DESCRIPTION OF THE DRAWINGS

FIGS. 5 and 7 are block diagrams showing other embodiments of the conversion unit 200, respectively;

FIG. 10 is a block diagram showing the apparatus constitution embodying the present invention in one aspect;

FIG. 11 is a block diagram showing the apparatus constitution embodying the present invention in another aspect;

FIG. 12 is a plan view showing the content of color information data applied to ROM's $12_1$-$12_3$ in FIG. 11;

FIG. 13b is a flow chart showing the conversion processing operation of color gradation. information effected by a microprocessor 18 in FIG. 13a; and FIG. 13c is a time chart showing the operation timings of respective parts of the apparatus during the conversion processing in FIG. 13b.

DESCRIPTION OF PREFERRED EMBODIMENTS

Hereinafter, preferred embodiments of the present invention will be described with reference to the drawings.

Figure 1:
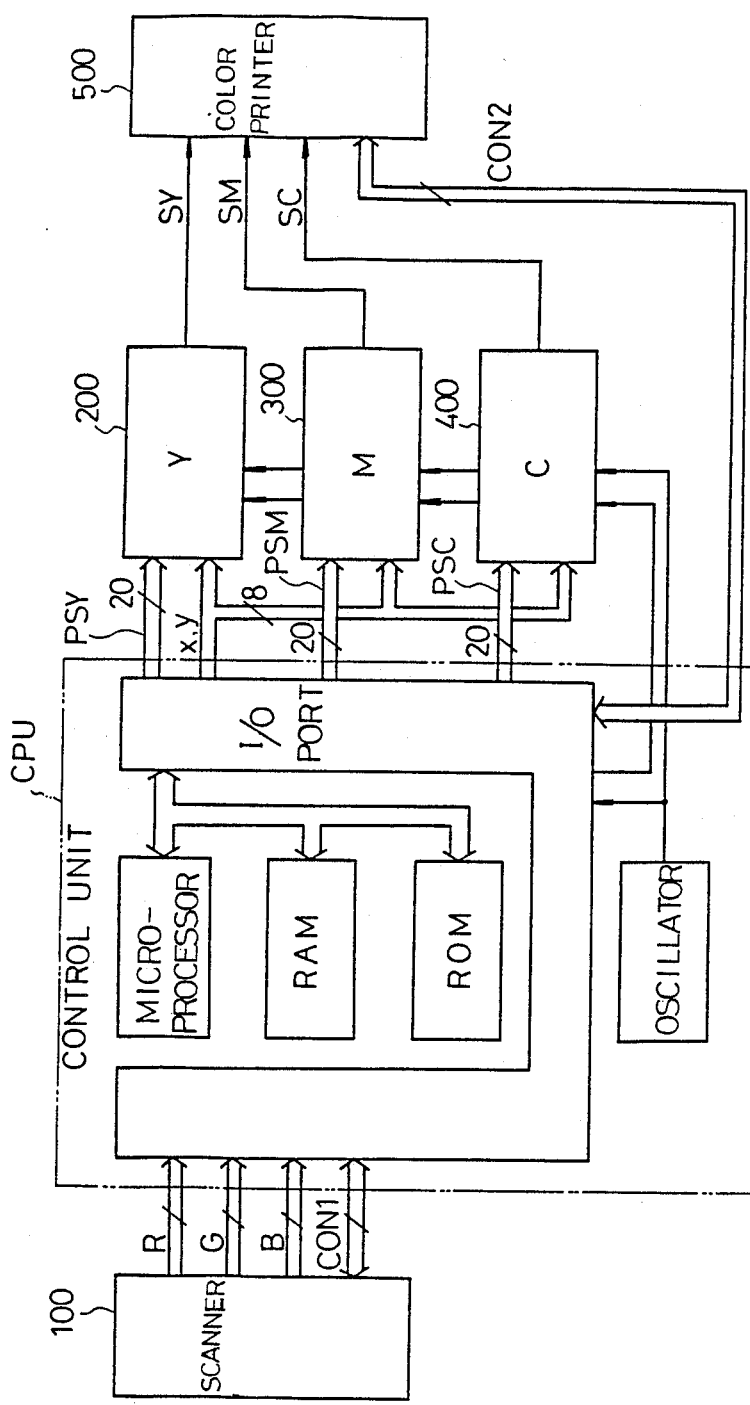
FIG. 1 is a block diagram showing an image processing apparatus of one type embodying the present invention.

FIG. 1 shows an image processing apparatus of one type embodying the present invention. Description will now be made by referring to FIG. 1. A control unit CPU comprises a microprocessor, a RAM (read/write memory), a ROM (read only memory:program memory), an I/O port, an oscillator, etc. A scanner 100 is connected to the I/O port of the control unit CPU through certain signal lines.

The scanner reads information on a predetermined document for each of three primary colors (R, G, B) and outputs digital multi-value data in response to a gradation level for each color. The control unit CPU reads image data from the scanner 100 for each color and, after carrying out the predetermined processing, conducts the recording processing operation on a color printer 500. Between the control unit CPU and the color printer 500, there are provided conversion units 200, 300 and 400 for converting gradation data to binary data.

These conversion units 200, 300 and 400 process color information of Y (yellow), M (magenta) and C (cyan), respectively.

Figure 2:
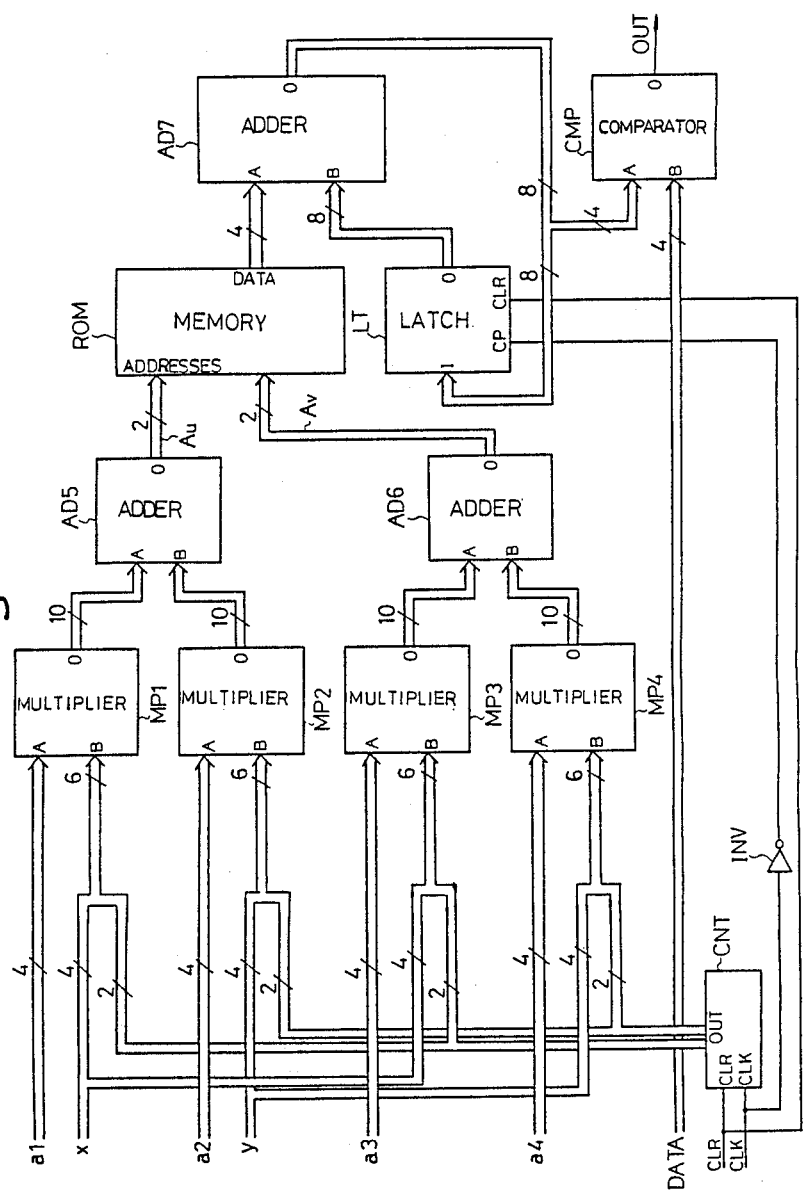
FIG. 2 is a block diagram showin a conversion unit 200 in FIG. 1.
Figure 3:
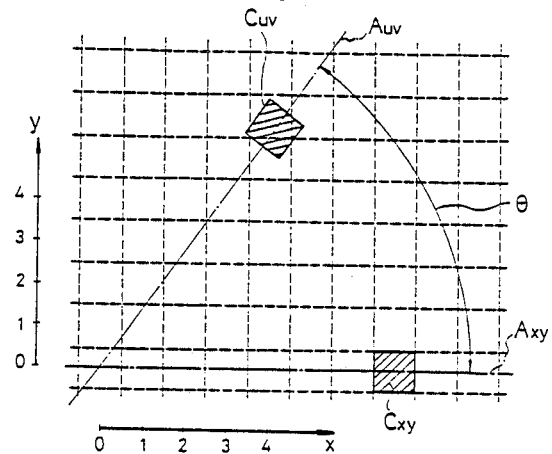
FIG. 3 and FIGS. 4a and 4b are plan views showing the processing of coordinate convertion.

FIG. 2 shows an embodiment of the conversion unit 200 in FIG. 1 (other conversion units 300 and 400 have the same elements). First explaining briefly, in this embodiment, coordinate conversion is performed using a circuit composed of multipliers MP1, MP2, MP3 and MP4 as well as adders AD5 and AD6. A memory ROM stores therein a table in which predetermined threshold data are allocated to individual elements of a two-dimensional matrix one to one. In this embodiment, the matrix consists of the elements 4×4. The remaining circuit elements are provided to perform the processing of interpolation.

Figure 4A:
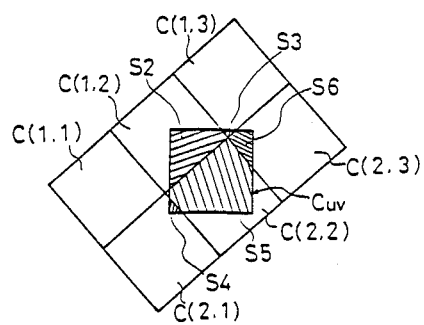

The principles of the interpolation processing in this embodiment will now be described. In the illustrated example, interpolation is performed on the basis of a so-called area allocation method. Referring to FIG. 4, a cell Cuv after coordinate conversion is projected in parts over a plurality of cells having the coordinates (1,2), (1,3), (2,1), (2,2) and (2,3) on the original x, y coordinate system. Assuming that the areas projected over those cells are S2, S3, S4, S5 and S6, respectively, and the thresholds allocated to those cells are C(1,2), C(1,3), C(2,1), C(2,2) and C(2,3), respectively, the threshold C(u,v) of the cell Cuv after coordinate conversion is represented by the following equation:

$$C(u,v)=[S2 \cdot C(1,2)+S3\cdot C(1,3)+S4\cdot C(2,1)+S5\cdot C(2,2)+S6\cdot C(2,3)]/(S2+S3+S4+S5+S6) \quad (3)$$

In other words, according to this interpolation method, the thresholds of all the cells (Cxy) over which is projected the cell Cuv are weighed in accordance with the respective projected areas, and the total sum of the weighed values is divided by the number of cells. The resulting average value is regarded as the result of interpolation (i.e., threshold).

However, such area calculation and so on takes a very long time in case of resorting to a software, while the apparatus constitution is very complicated in case of resorting to a hardware. In this embodiment, therefore, interporation of the area allocation is approximately performed as follows.

Figure 4B:
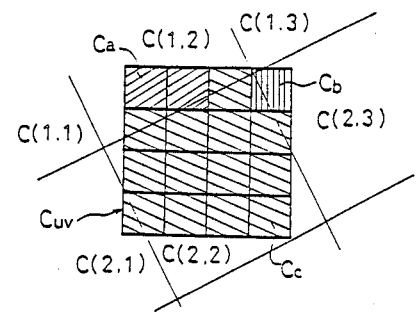

More specifically, as shown in FIG. 4b, the cell Cuv is divided into 16 parts equal to one another and it is judged over which cell (Cxy) is most largely projected each of the divided minute cells (to which cell (Cxy) belongs the center of each minute cells. Then, the number of corresponding minute cells is assumed to represent the projected area. In FIG. 4b, for example, the magnitudes (or the numbers of minute cells) of a region Ca projected over C(a,2), a region Cb projected over C(2,3) and a region Cc projected over C(2,2) are 2, 1 and 13, respectively.

Accordingly, the threshold C(u,v) in this case is determined as follows:

$$C(u,v)=[2\cdot C(1,2)+C(2,3)+13\cdot C(2,2)]/16$$

Such division into 16 parts equal to one another practically means that a minute coordinate shift ($\Delta \times x, \Delta y$) below 1, and corresponding to 16-division is applied to each coordinate Cuv determined through coordinate conversion. Then, the above processing can be implemented by using the integer parts of the results to refer to thresholds allocated to the respective integer coordinates, and by dividing the addition value of those thresholds by 16.

Description will be continued by returning back to FIG. 2. In this embodiment, 16 clock pulses are applied to a signal line CLK for each input gradation data (DATA). CNT designates a 4-bit counter for counting those clock pulses. Lower two bits of an output from the counter CNT are connected to lower two bits of an input terminal B of each of the multipliers MP1 and MP3, while upper two bits of the output from the counter CNT are connected to lower two bits of an input terminal B of each of the multipliers MP2 and MP4.

It is to be noted that, in this embodiment, each of the multipliers MP1, MP2, MP3 and MP4 performs multiplication of 4 bits (A)×6 bits (B) and outputs data of 10-bit.

The coordinate values x and y updated upon incoming of each gradation data are applied to upper four bits of input terminals B of the multipliers MP1, MP3 and MP2, MP4, respectively. To four bits of input terminals A of the multipliers MP1, MP2, MP3 and MP4, there apply data of constants a1, a2, a3 and a4 in accordance with the screen angle, respectively.

Output terminals of the multipliers MP1 and MP2 are respectively connected to input terminals A and B of the adder AD5, while output terminals of the multipliers MP3 and MP4 are respectively connected to input terminals A and B of the adder AD6.

Therefore, the following coordinate values u and v appear at output terminals of the adders AD5 and AD6.

$$u = a1(x+\Delta x) + a2(y+\Delta y) \quad (4)$$

$$v = a3(x+\Delta x) + a4(y+\Delta y) \quad (5)$$

where $\Delta x$ and $\Delta y$ are minute coordinate shifts respectively given by the lower two bits and the upper two bits of the counter CNT.

Lower two bits of each of the adders AD5 and AD6 correspond to a decimal part of the coordinate value. Accordingly, these lower two bits are deleted and, since the threshold matrix is in the form of 4×4 in this embodiment, only those respective upper two bits (Au, Av) higher than the deleted bits are sampled. The total four bits are applied to address lines of the memory ROM.

The memory ROM includes sixteen 4-bit memories corresponding to 4-bit addresses, and each memory stores therein preset threshold data. A data output terminal of the memory ROM is connected to lower four bits of an input terminal A of the adder AD7, while upper four bits of the input terminal A of the adder AD7 are set to zero at all times.

An output terminal of a latch LT is connected to an input terminal B of the adder AD7. To a latch pulse input terminal CP of the latch LT is applied a signal on the signal line CLK through an inverter INV. Thus, every time u and v given by the equations (4) and (5), i.e., address information applied to the memory ROM, are updated, the latch LT serves to latch output data from the adder AD7 in synchronous relation with clock pulses a half clock cycle behind the update.

The data latched by the latch LT is applied to an input terminal B of the adder AD7. This operation is repeated sixteen times for each gradation data so that, after the completion of sixteen operations, the total sum of sixteen threshold data appears at the output terminal of the adder AD7. Among 8-bit signal lines output from the adder AD7, upper four bits are connected to an input terminal A of a digital comparator CMP. In other words, deletion of lower four bits of the data and sampling of upper four bits thereof are equivalent to the fact that the data is shifted toward lower digits by four bits, and mean in a binary code that the data is divided by 16. More specifically, the 4-bit data (threshold) applied to the input terminal A of the digital comparator CMP represents the value which is obtained by applying different minute coordinate shifts of 0, ¼, 2/4 or 182 to the coordinate values x and y of the input gradation data (DATA) in sixteen times, referring to the threshold matrix table with sixteen coordinates given by the equations (4) and (5), and then dividing the total sum of the referred values by 16. The resulting value corresponds to a threshold which is obrained from the values after coordinate conversion through interporation on the basis of the method that is effectively regarded as an area allocation method.

To an input terminal B of the digital comparator CMP is input the 4-bit gradation data DATA. The digital comparator CMP serves to compare the threshold applied to its input terminal A with the gradation level applied to its input terminal B, so that it is issues a high level H (recording level) at an output terminal OUT if A<B is met, and sets a low level L (non-recording level) at the output terminal under other conditions. Consequently, binary data is obtained at the output terminal of the digital comparator CMP.

Referring again to FIG. 1, there are provided three conversion units 200, 300 and 400 in this embodiment. Coordinate information x, y of the input gradation data are commonly applied to those three conversion units. The control unit CPU is connected to the conversion unit 200 through a data line PSY of 20 bits comprising 16-bit constant data (a1-a4) in response to a yellow screen angle and 4-bit gradation data (DATA) of a yellow component, the control unit CPU is connected to thre conversion unit 300 through a data line PSM of 20 bits comprising 16-bit constant data in response to a magenta screen angle and 4-bit gradation data of a magent component, and the control unit CPU is connected to the conversion unit 400 through a data line of 20 bits comprising 16-bit constant data in response to a cyan screen angle and 4-bit gradation data of a cyan component.

Clock pulses from the oscillator and a clear signal (CLR) from the I/O port are commonly applied to the conversion units 200, 300 and 400. Output lines SY, SM and SC of the conversion units 200, 300 and 400 are connected to the color printer 500. A timing signal indicating effectiveness of a signal level on each of the signal lines SY, SM and SC (or indicating that the total sum of sixteen threshold data is appearing at the output terminal of the adder AD7) is applied from the control unit CPU to the color printer 500 through a control line CON2.

FIG. 5 shows a conversion unit embodying the present invention in another aspect. In this embodiment, similarly to the foregoing embodiment, coordinate conversion is performed using four multipliers MP1, MP2, MP3, MP4 and two adders AD1, AD2. In the illustrated example, each of the multipliers MP1-MP4 performs calculation of 4 bits×4 bits and outputs the calculated result of 8 bits.

In the embodiment of FIG. 5, the integer coordinate nearest to the coordinate after coordinate conversion is used to refer to the threshold matrix table. By obtaining the nearest integer coordinate, a coordinate error is restrained to be 0.5 at maximum with respect to each coordinate axis. This processing can be implemented by adding 0.5 to the values after coordinate conversion and then sampling only the integer parts of the resulting sums.

Figure 6:
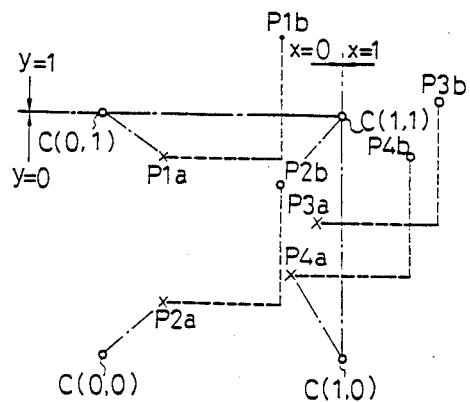
FIGS. 6, 8 and 9 are plan view showing the processing of interporation.

More specifically, assume that, as shown in FIG. 6 by way of example, arbitrary coordinate cells P1a, P2a, P3a and P4a have the cells C(1,0), C(0,0), C(1,1) and C(1,0) to be selected as the nearest integer coordinate cells, respectively. A shift of +0.5 is added to the coordinate values x and y of each of those arbitray coordinate cells, as a result of which coordinate values (x, y) of the cells P1b, P2b, P3b and P4b after shifting are given as $(0+\alpha 1, 1+\beta 1)$, $(0+\alpha 2, 0+\beta 2)$, $(1+\alpha 3, 1+\beta 3)$ and $(1+\alpha 4, 0+\beta 4)$, respectively, where $\alpha 1$ to $\alpha 4 < 0.5$ and $\beta 1$ to $\beta 4 < 0.5$. By sampling only the integer parts of the resulting values, the coordinate values (x, y) after shifting become (0,1), (0,0), (1,1) and (1,0) which are apparently coincident with the coordinate values of the cells C(0,1), C(0,0), C(1,1) and C(1,0) to be selected, respectively.

The adders AD1 and AD2 shown in FIG. 5 are each an adder of 9 bits+9 bits, and 8-bit output lines of the multipliers MP1, MP2 and MP3, MP4 are connected to upper eight bits of the adders AD1 and AD2. An input terminal A of each of the adders AD1, AD2 has a least significant bit (LSB) fixed at zero (low level L), while an input terminal B thereof has a least significant bit fixed at one (high level H). Thus, the value given by adding 0.5 to an output value of the multiplier MP2 is applied to the input terminal B of the adder AD1, while the value given by adding 0.5 to an output value of the multiplier MP4 is applied to the input terminal B of the adder AD2.

Because the least significant bit of an output from each of the adders AD1 and AD2 represents the decimal part, the predetermined lower bits (corresponding to an array of the matrix) other than the least significant bit are connected to an address terminal of a memory ROM. In this embodiment, the ROM directly stores therein as data the thresholds in response to the array coordinates output from the adders AD1 and AD2, and the rsults of comparison of their values with the gradation data values. Therefore, the gradation data is also applied to a predetermined address terminal of the memory ROM. Binary data is obtained at a data output terminal of the memory ROM.

FIG. 7 shows a conversion unit embodying the present invention in still another aspect. In this embodiment, similarly to the foregoing embodiments, coordinate conversion is performed using four multipliers MP1, MP2, MP3, MP4 and two adders AD1, AD2. In the illustrated example, an integer part and a decimal part of the coordinate value obtained at an output terminal of each of the adders AD1 and AD2 are both applied to address terminals of a memory ROM. The memory ROM has also previously stored the threshold data after interporation on the decimal coordinate system in the form of a table in the predetermined addresses.

Accordingly, with only addresses applied to the memory ROM, the threshold data after interporation is issued from a data output terminal of the memory ROM. This threshold data is compared with the gradation data DATA in a digital comparator CMP, so that binary data corresponding to the comparison result is issued from an output terminal of the CMP.

A part of the table to be stored in the memory ROM in this case is given by the following Table 1.

TABLE 1

| | Upper Addresses | | | | | |
|---|---|---|---|---|---|---|
| | x − ¼ | x | x + ¼ | x + 2/4 | x + ¾ | x + 1 |
| Lower Addresses | | | | | | |
| y − ¾ | D1 | D9 | D17 | D25 | D33 | D41 |
| y − 2/4 | D2 | D10 | D18 | D26 | D34 | D42 |
| y − ¼ | D3 | D11 | D19 | D27 | D35 | D43 |
| y | D4 | D12 | D20 | D28 | D36 | D44 |
| y + ¼ | D5 | D13 | D21 | D29 | D37 | D45 |
| y + 2/4 | D6 | D14 | D22 | D30 | D38 | D46 |
| y + ¾ | D7 | D15 | D23 | D31 | D39 | D47 |
| y + 1 | D8 | D16 | D24 | D32 | D40 | D48 |

(Note) D8 and D9 (and others in similar relation) are not on successive addresses.

In the Table 1, data are stored in ¼ coordinate units such that the data locating on integer coordinates are D12, D16, D44 and D48 and the remaining data are those produced through interporation.

When the thresholds after interporation are stored in the form of a table as in this embodiment, the stored thresholds are variable in accordance with the method of interporation. In other words, any desired interporation method can be used in the constitution of this type. For example, the data interporated on the basis of the area allocation method shown in the equation (3) or the method shown in FIG. 5 may be stored in the form of a table.

Herein, there will be described the cases of using other three types of interporation methods.

LINEAR INTERPORATION METHOD

Figure 8:
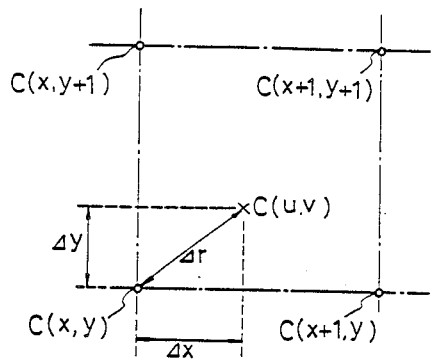

As shown in FIG. 8, consiser an arbitrary coordinate cell Cuv and four integer coordinate cells C(x,y), C(x+1,y), C(x,y+1) and C(x+1,y+1) surrounding the cell Cuv. Decimal coordinate values of the arbitrary coordinate cell are $\Delta x$ and $\Delta y$. At this time, the threshold at each of the integer coordinate cells is weighed with the product of (complement of) a distance along the x-axis and (complement of) a distance along the y-axis between the relevant cell and the arbitrary coordinate cell. The total sum of the weighed values is regarded as a threshold C(u,v) of the arbitrary coordinate cell Cuv. Thus, the threshold is determined from the following equation:

$$C(u,v) = C(x,y)\cdot(1-\Delta x)\cdot(1-\Delta y) + C(x+1, y)\cdot\Delta x\cdot(1-\Delta y) + C(x, y+1)\cdot(1-\Delta x)\cdot\Delta y + C(x+1, y+1)\cdot\Delta x\cdot\Delta y \quad (6)$$

By way of example, consider application of this method to data D22 in case of producing the data as shown in the Table 1. The decimal coordinate values $\Delta x$ and $\Delta y$ in this case are ¼ and 2/4, respectively, and the four integer coordinate data surrounding the data D22 ade D12, D16, D44 and D48. Accordingly, the following is obtained from the equation (6):

$$\begin{aligned} D22 &= D12 \cdot (1 - 1/4) \cdot (1 - 2/4) + \\ &\quad D44 \cdot (1/4) \cdot (1 - 2/4) + \\ &\quad D16 \cdot (1 - 1/4) \cdot (2/4) + D48 \cdot (1/4) \cdot (2/4) \\ &= D12 \cdot (3/8) + D44 \cdot (1/8) + D16 \cdot (3/8) + \\ &\quad D48 \cdot (1/8) \end{aligned}$$

By substituting 5, 6, 7 and 8 for D12, D44, D16 and D48, respectively by way of example, as specific numeral values:

$$\begin{aligned} D22 &= 5 \cdot (3/8) + 6 \cdot (1/8) + 7 \cdot (3/8) + 8 \cdot (1/8) \\ &= (15/8) + (3/4) + (21/8) + 1 \\ &= (15 + 6 + 21 + 8)/8 \\ &\approx 6 \end{aligned}$$

DISTANCE ALLOCATION METHOD

As shown in FIG. 8, consider an arbitrary coordinate cell Cuv and four integer coordinate cells C(x,y), C(x+1,y), C(x,y+1) and C(x+1,y+1) surrounding the cell Cuv. At this time, a distance r between the arbitrary coordinate cell Cuv and the integer coordinate Cxy is given by $\Delta x^2 + \Delta y^2)^\alpha$ (where $\alpha$ equals to ½). Supposing that the erspective integer coordinate cells C(x,y), C(x+1,y), C(x,y+1) and C(x+1,y+1) would influence the arbitrary coordinate cell Cuv inversely proportional to distances therebetween, a threshold C(u,v) of the arbitrary coordinate cell Cuv can be obtained from the following equation on the assumption that those distances are r1, r2, r3 and r4.

$$C(u,v)=[C(x,y)/r_1+C(x+1,y)/r_2+C(x,y+1)/r_3+\\C(x+1,y+1)/r_4]/[(1/r_1)+(1/r_2)+(1/r_3)+(1/r_4)] \quad (7)$$

Herein, consider again application of this method to the data D22 in the table 1. The decimal coordinate values Δx and Δy in this case are ¼ and 2/4, respectively.

First, the distances r1 to r4 are determined as follows:

$$r1=[(\tfrac{1}{4})^2+(2/4)^2]^\alpha=(5/16)^\alpha$$

$$r2=[(1-\tfrac{1}{4})^2+(2/4)^2]^\alpha=(13/16)^\alpha$$

$$r3=[(\tfrac{1}{4})^2+(1-2/4)^2]^\alpha=(5/16)^\alpha$$

$$r4=[(1-\tfrac{1}{4})^2+(1-2/4)^2]^\alpha=(13/16)^\alpha$$

By substituting these distances into the equation (7):

$$D22=[D12/(5/16)^\alpha+D44/(13/16)^\alpha+D16/(5/16)^\alpha+D48/(13/16)^\alpha]\times 2/[(5)^\alpha+(13)^\alpha]$$

Herein, by substituting 5, 6, 7 and 8 for D12, D44, D16 and D48, respectively by way of example, as specific numeral values:

$$\begin{aligned}D22 &= [5/(5/16)^\alpha + 6/(13/16)^\alpha + 7/(5/16)^\alpha + \\&\quad 8/(13/16)^\alpha] \times 2/[(5)^\alpha + (13)^\alpha]\\&= [6 \cdot (5)^\alpha + 7 \cdot (13)^\alpha]/[(5)^\alpha + (13)^\alpha]\\&\approx 7\end{aligned}$$

CUBIC CONVOLUTION

Figure 9:
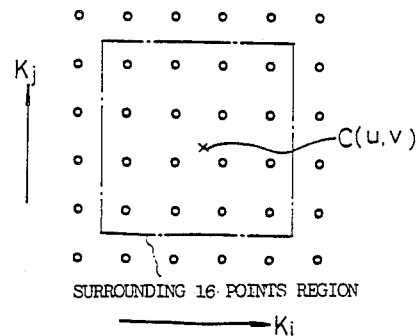

Supposing that, as shown in FIG. 9, sixteen integer coordinate cells Cxy surrounding an arbitrary coordinate cell Cuv would influence the cell Cuv in accordance with the term of Sin πd/πd (where d is a distance along each axis), interporation is performed through approximation using a cubic polynominal expression of Sin πd/πd.

More specifically, the objective threshold can be obtained as follows on the assumption that respective integer coordinates are represented by i, j and thresholds at the integer coordinates are given by C(i,j).

$$C(u,v) = \sum_i \sum_j C(i,j) \cdot g(i-u) \cdot g(j-v) \quad (8)$$

where g(d) is given as follows:

$$g(d) = 1 - 2|d|^2 + |d|^3 : 0 \leq |d| < 1$$

$$g(d) = 4 - 8|d| + 5|d|^2 - |d|^3 : 1 \leq |d| < 2$$

$$g(d) = 0 : 2 \leq |d|$$

Herein, determine the threshold C(u,v) in case for u and v to offer ¼ and 2/4, respectively, supposing that the thresholds of those coordinates corresponding to the sixteen surrounding cells are represented by the following table 2.

TABLE 2

| | Coordinate i | | | |
|---|---|---|---|---|
| | −1 | 0 | 1 | 2 |
| Coordiante j | | | | |
| −1 | 2 | 10 | 17 | 44 |
| 0 | 3 | 7 | 21 | 48 |
| 1 | 11 | 14 | 29 | 52 |

TABLE 2-continued

| | Coordinate i | | | |
|---|---|---|---|---|
| | −1 | 0 | 1 | 2 |
| 2 | 18 | 26 | 33 | 56 |

The following Table 3 represents distances |i−u| between the sixteen coordinates and the arbitrary coordinate Cuv, and the Table 4 represents distances |j−v|.

TABLE 3

| |i − u| | Coordinate i | | | |
|---|---|---|---|---|
| | −1 | 0 | 1 | 2 |
| Coordinate j | | | | |
| −1 | 5/4 | ¼ | ¾ | 7/4 |
| δ | 5/4 | ¼ | ¾ | 7/4 |
| 1 | 5/4 | ¼ | ¾ | 7/4 |
| 2 | 5/4 | ¼ | ¾ | 7/4 |

TABLE 4

| |j − v| | Coordinate i | | | |
|---|---|---|---|---|
| | −1 | 0 | 1 | 2 |
| Coordinate j | | | | |
| −1 | 6/4 | 6/4 | 6/4 | 6/4 |
| 0 | 2/4 | 2/4 | 2/4 | 2/4 |
| 1 | 2/4 | 2/4 | 2/4 | 2/4 |
| 2 | 6/4 | 6/4 | 6/4 | 6/4 |

From the values in the Tables 3 and 4, g(i−u) and g(j−v) in the equation (8) are determined as in the following Tables 5 and 6, respectively.

TABLE 5

| g(i − u) | Coordinate i | | | |
|---|---|---|---|---|
| | −1 | 0 | 1 | 2 |
| Cordinate j | | | | |
| −1 | −9/64 | 57/64 | 19/64 | −3/64 |
| 0 | −9/64 | 57/64 | 19/64 | −3/64 |
| 1 | −9/64 | 57/64 | 19/64 | −3/64 |
| 2 | −9/64 | 57/64 | 19/64 | −3/64 |

TABLE 6

| g (j − v) | Coordinate i | | | |
|---|---|---|---|---|
| | −1 | 0 | 1 | 2 |
| Coordinate j | | | | |
| −1 | −8/64 | −8/64 | −8/64 | −8/64 |
| 0 | 40/64 | 40/64 | 40/64 | 40/64 |
| 1 | 40/64 | 40/64 | 40/64 | 40/64 |
| 2 | −8/64 | −8/64 | −8/64 | −8/64 |

Accordingly, influences CiJ due to the respective integer coordinate cells Cij are given as follows from the Tables 2, 5 and 6:

ΔCaa: 2 · (−9/64) · (−8/64), ΔCab: 3 · (−9/64) · (40/64)
ΔCac: 11 · (−9/64) · (40/64), ΔCad: 18 · (−9/64) · (−8/64)
ΔCba: 10 · (57/64) · (−8/64), ΔCbb: 7 · (57/64) · (40/64)
ΔCbc: 14 · (57/64) · (40/64), ΔCbd: 26 · (57/64) · (−8/64)
ΔCca: 17 · (19/64) · (−8/64), ΔCcb: 21 · (19/64) · (40/64)
ΔCcc: 29 · (19/64) · (40/64), ΔCcd: 33 · (19/64) · (−8/64)
ΔCda: 44 · (−3/64) · (−8/64), ΔCdb: 48 · (−3/64) · (40/64)
ΔCdc: 52 · (−3/64) · (40/64), ΔCdd: 56 · (−3/64) · (−8/64)

where a=−1, b=0, c=1, d=2

$$C(u,v) = \Delta Caa + \Delta Cab + \Delta Cac + \Delta Cad + \Delta Cba + \Delta Cbb +$$
$$\Delta Cbc + \Delta Cbd + \Delta Cca + \Delta Ccb + \Delta Ccc + \Delta Ccd +$$
$$\Delta Cda + \Delta Cdb + \Delta Cdc + \Delta Cdd$$
$$\approx 12$$

As described in the above, according to this embodiment, it becomes possible to set any desired screen angle through calculation of coordinate conversion. Also, an error caused by coordinate conversion can be made small with the processing of interporation.

Next, still other embodiments of the present invention will be described. It is to be noted that, in any of the later-described embodiments, color information is converted following the masking equations below:

$$Y = f1(R) + f2(G) + f3(B),$$
$$M = f4(R) + f5(G) + f6(B), \text{ and}$$
$$C = f7(R) + f8(G) + f9(B),$$
$$f1(R) = a11R + a12R^2 + a13R^3$$
$$f2(G) = a14G + a15G^2 + a14G^3$$
$$f3(B) = a17B + a18B^2 + a19B^3$$
$$f4(R) = a21R + a22R^2 + a23R^3$$
$$f5(G) = a24G + a25G^2 + a24G^3$$
$$f6(B) = a27B + a28B^2 + a29B^3$$
$$f7(R) = a31R + a32R^2 + a33R^3$$
$$f8(G) = a34G + a35G^2 + a34G^3$$
$$f9(B) = a37B + a38B^2 + a39B^3$$

FIG. 10 shows the apparatus constitution embodying the present invention in one aspect. In this constitution, color image information on a color document 1 is read by a scanner 3 of an image reading unit 2 in separate color components, and color component gradation data R, G and B are applied to address data input terminals of ROM's $6_1$ to $6_9$.

The ROM $6_1$ has previously memorized therein the calculated values of f1(R) for respective R values in a predicted range of R with the R values as addresses. Six bits are allocated to R to provide 64 gradations (or 65 gradations including colorless one 0), and memory data consists of $2^8$ words. The memory data is obtained by experimentally setting correction coefficients a11, a12 and a13 of f1(R) suitable for the system (combination of the image reading unit 2 and an image recording unit 8) using the method of least squares, and then calculating the value of f1(R) for each of R=1 to 64.

Likewise, the ROM $6_2$ has previously memorized therein the calculated values of f2(B) for respective G values in a predicted range of G with the G values as addresses. In like manner, the ROM $6_3$ has previously memorized therein the calculated values of f3(B) for respective B values in a predicted range of B with the B values as addresses, the memory ROM $6_4$ has previously memorized therein the calculated values of f4(R) for respective R values in a predicted range of R, the memory ROM $6_5$ has previously memorized therein the calculated values of f5(G) for respective G values in a predicted range of G, the memory $6_6$ has previously memorized therein the calculated values of f6(B) for respective B values in a predicted range of B, the memory ROM $6_7$ has previously memorized therein the calculated values of f7(R) for respective R values in a predicted range of R, the memory $6_8$ has previously memorized therein the calculated values of f8(G) for respective G values in a predicted range of G, and the memory $6_9$ has previously memorized therein the calculated values of f9(B) for respective B values in a predicted range of B.

Therefore, when the output gradation data from the image reading unit 2 are given by Ri, Gi and Bi, the ROM's $6_1$ to $6_9$ issue outputs as follows:

ROM1: f1 (Ri), ROM2: f2(Gi),
ROM3: f3 (Bi), ROM4: f4(Ri),
ROM5: f5 (Gi), ROM6: f6(Bi),
ROM7: f7 (Ri), ROM8: f8(Gi),
ROM9: f9 (Bi)

An adder 7y receives outputs from the ROM's $6_1$ to $6_3$ and applies data indicating the sum of those outputs, i.e., Yi=f1(ri)+f2(Gi)+f3(Bi), to the image reading unit 8. The image reading unit 8 stores Yi in a yellow recording gradation data buffer.

An adder 7m receives outputs from the ROM's $6_4$ to $6_6$ and applies data indicating the sum of those outputs, i.e., Mi=f4(Ri)+f5(Gi)+f6(Bi), to the image reading unit 8. The image reading unit 8 stores Mi in a magenta recording gradation data buffer.

An adder 7c receives outputs from the ROM's $6_7$ to $6_9$ and applies data indicating the sum of those outputs, i.e., Ci=f7(Ri)+f8(Gi)+f9(Bi), to the image reading unit 8. The image reading unit 8 stores Ci in a cyan recording fradation data buffer.

To the image reading unit 2 are applied a line synchronization signal, an element synchronization signal and other control signals from a timing controller 10, so that in synchronous relation with the element synchronization element, the color component gradation data Ri, Gi and Bi for each element are selectively applied to the ROM's $6_1$ to $6_9$ through separate lines. The ROM's $6_1$ to $6_9$ update and latch the address data (Ri, Gi and Bi), in synchronous relation with the element synchronization signal, and output the corresponding memory data f1(Ri) to f9(Bi) in the addresses indicated by the latched data. Each of the adders 7y to 7c implements addition of the input data and then outputs and latches the calculated result while updating the same in synchronous relation with the element synchronization signal. The image recording unit 8 transfers the data in the unput buffer memory into another buffer memory in synchronous relation with the line synchronization signal, and reads the input data Yi, Mi and Ci into the input buffer memory in synchronous relation with the element synchronization signal.

As described in the above, in this embodiment, the ROM's are accessed with the document reading color component gradation data Ri, Gi and Bi to read the functional values f1(Ri), f2(Gi), f3(Bi), f4(Ri), f5(Gi), f6(Bi), f7(Ri), f8(Gi) and f9(Bi) corresponding to the gradation data Ri, Gi and Bi out of the ROM's, so that the sum of fi(Ri), f2(Gi) and f3(Bi), the sum of f4(Ri), f5(Gi) and f6(Bi), and the sum of f7(Ri), f8(Gi) and f9(Bi) are calcuIaetd by the adders to obtain the recording gradation data Yi, Mi and Ci. As a result, the processing speed becomes high and the memory capacity necessary for the ROM's is reduced down to the order of $2^6 \times 9$ words for three components each having 64 gradations. Nevertheless, conversion information can be obtained using the masking equations of second or higher degrees, whereby it is possible to convert the color information with high color reproducibility in conformity with characteristics of the image reading unit 2 and the image recording unit 8(e.g., a color gradation reading characteristic of the scanner and a color expression characteristic of the printer). It is to be noted that, if the table look-up system envisaged in the past is implemented similarly for three colors each having 64 gradations, the memory capacity of $2^{18}$ would be needed. Thus, in this embodiment, the memory capacity corresponding to the difference of $2^{18} - 2^6 \times 9$ can be saved.

FIG. 11 shows the apparatus constitution embodying the present invention in another aspect. In this constitution, color component gradation data R, G and B from an image reading unit 2 each for one line are stored into buffer memories 11r, 11g and 11b, respectively. At the time when the data for one line has been stored, fthe color component gradation data R, G and B for each element are read in sequence and applied to address data input terminals of ROM's $12_1$, $12_2$ and $12_3$.

The ROM $12_1$ has previously memorized therein the calculated values of a function f1(R) for respective R values, the calculated values of a function f4(R) for respective R values, and the calculated values of a function f7(R) for respective R values with both color information data (2 bits) and the R values as addresses. As shown in FIG. 12, the color information data consists of 01, 10 and 11 allocated to designation of yellow Y, magenta M and cyan C, respectively. Specifically, the calculated values of the function f1(R) for respective R values have been previously stored in those addresses specified by both the yellow Y designation data of 2 bits 01 and the R value of 6 bits, the calculated values of the function f4(R) for respective R values have been previously stored in those addresses specified by both the magenta M designation data of 2 bits 10 and the R value of 6 bits, and the calculated values of the function f7(R) for respective R values have been previously stored in those addresses specified by both the cyan C designation data of 2 bits 11 and the R value of 6 bits.

The ROM $12_2$ has previously memorized therein the calculated values of a function f2(R) for respective G values, the calculated values of a function f5(G) for respective G values, and the calculated values of a function f8(R) for respective G values with both the color information data (2 bits) and the R values as addresses. More specifically, the calculated values of the function f2(G) for respective G values have been previously stored in those addresses specified by both the yellow Y designation data of 2 bits 01 and the G value of 6 bits, the calculated values of the function f5(G) for respective G values have been previously stored in those addresses specified by both the magenta M designation data of 2 bits 10 and the G value of 6 bits, and the calculated values of the function f3(G) for respective G values have been previously stored in those addresses specified by both the cyan designation data of 2 bits 11 and the G value of 6 bits.

The ROM $12_3$ has previously memorized therein the calculated values of a function f3(B) for respective B values, the calculated values of a function f6(B) for respective B values, and the calculated values of a function f9(B) for respective B values with both the color information data (2 bits) and the B values as addresses. More specifically, the calculated values of the function f3(B) for respective B values have been previously stored in those addresses specified by both the yellow Y designation data of 2 bits 01 and the B value of 6 bits, the calculated values of the function f6(B) for respective B values have been previously stored in those addresses specified by both the magenta M designation data of 2 bits 10 and the B value of 6 bits, and the calculated values of the function f9(B) for respective B values have been previously stored in those addresses specified by both the cyan C designation data of 2 bits 11 and the B value of 6 bits.

In this embodiment, in timed relationship with that the color gradation data for one line has been stored into each of the buffer memories 11r, 11g and 11b, a timing controller 10 reads the data for each element sequentially from the leading one in the one-line data and, after update of reading for each element, first sets a distributor 14 causing an output from the adder 13 to be applied to a yellow data buffer memory (Y) of an image recording unit 8, applies the color information data 01 (yellow: Y) to the ROM's $12_1$–$12_3$, instructs the adder 13 to perform an addition, and then instructs the image recording unit 8 to read the added result into the buffer memory (Y). Subsequently, the timing controller 10 sets the distributor 14 causing an output from the adder 13 to be applied to a magenta data buffer memory (M) of the image recording unit 8, applies the color information data 10 (magenta: M) to the ROM's $12_1$–$12_3$, instructs the adder 13 to perform an addition, and then instructs the image recording unit 8 to read the added result into the buffer memory (M). After that, the timing controller 10 sets the distributor 14 causing an output from the adder 13 to be applied to a cyan data buffer memory (C) of the image recording unit 8, applies the color information data 11 (cyan: C) to the ROM's $12_1$–$12_3$, instructs the adder 13 to perform an addition, and then instructs the image recording unit 8 to read the added result into the buffer memory (C) of the image recording unit 8. Thereafter, reading of the buffer memories 11r–11b is updated to the gradation data for the next data. The above process is repeated until the data for one line has been read out of each of the buffer memories 11r—11b and the conversion data for one one line has been sent to the image recording unit 8. Upon this, the timing controller 10 requests the image reading unit 2 to receive the color component gradation data for the next line, thus causing the data to be read into the buffer memories 11r—11b. Then, the similar processing will be continues for the subsequent lines.

Also in this embodiment, the ROM's $12_1$ to $12_3$ requires the total memory capacity of only $2^6 \times 9$ words as in the embodiment of FIG. 10. From the reason that reading addresses of each ROM are set to be 8 bits including the color information data of 2 bits, if all the addresses represented by 8 bits are to be stored in a memory area, the required memory capacity is as much as $2^8 \times 3$ words. In case of similarly implementing the table look-up system envisaged in the past for three colors each having 64 gradations, the memory capacity of $2^{18}$ would be needed. Thus, in this embodiment, the memory capacity corresponding to the difference of $2^{18} - 2^8 \times 3$ or above can be saved.

Figure 13A:
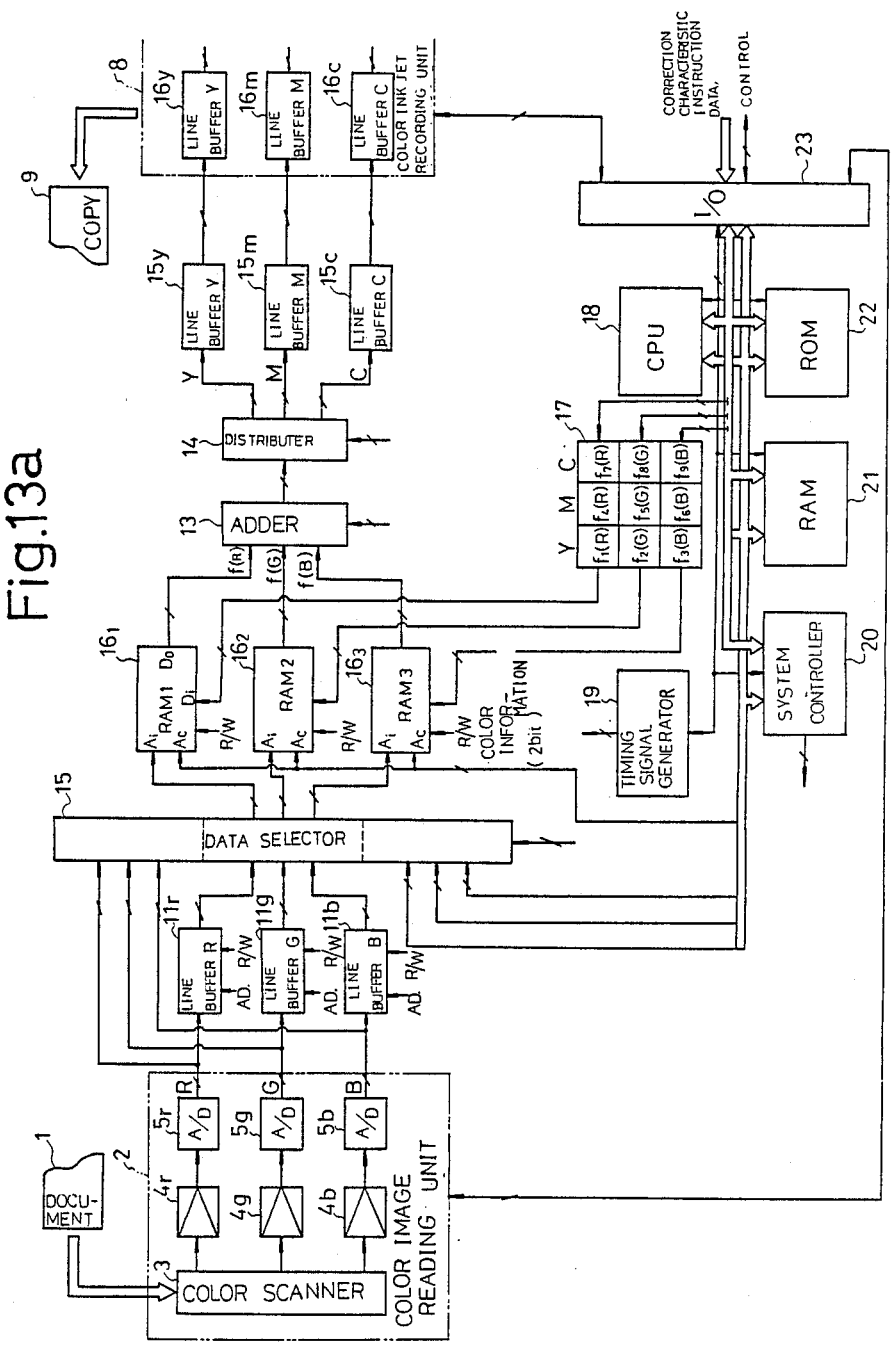
FIG. 13a is a block diagram showing the apparatus constitution embodying the present invention in still another aspect.

FIG. 13a shows the apparatus constitution embodying the present invention in still another aspect. In this constitution, A ROM 22 as a processing control data memory stores therein a calculation/write program which is used specify correction coefficient data in association with the correction characteristic data (color reading characteristic of a scanner 3, color reproduction characteristic of recording paper and color expression characteristic of ink), as well as correction coefficients in association with the correction characteristic data applied to an input/output port 23, calculates the values of functions f1(R) to f9(B) (17) for respective values in predicted ranges of R, G and B, and memorizes the calculated values of f1(R), f4(R) and f7(R) into a RAM $16_1$, the calculated values of f2(G), f5(G) and f8(G) into a RAM $16_2$, and the calculated values of f3(B), f6(B) and f9(B) into a RAM $16_3$. It is to be noted that, in FIG. 13a, a block 17 designates the calculated values of the functions in separate groups to explain allocation of those calculated values to the respective RAM's $16_1$–$16_3$ and, therefore, the block 17 does not represent the constitutional element of hardware.

The above correction coefficient data are given as follows:

$n$ data $(a111 - a11n)$ as $a11$,
$n$ data $(a121 - a12n)$ as $a12$,
$n$ data $(a131 - a13n)$ as $a13$,

.
.
.

$n$ data $(a371 - a37n)$ as $a37$,
$n$ data $(a381 - a38n)$ as $a38$,
$n$ data $(a391 - a39n)$ as $a39$ Before starting to read, reproduce and record a color image of one page, a microprocessor 18 reads the correction characteristic instruction data at the input/output port 23, specifies the respective correction coefficients a11 −a39 and hence the respective functions f1(R)–f9(B) corresponding to that data, calculate the functional values for respective values in ranges of R=1-64, G=1-64 and B=1-64 and B=1-64, and then writes the calculated values into the corresponding RAM's on the basis of relationship between the block 17 and the RAM's $16_1$–$16_3$. Stated differently, the correction characteristic instruction data represents a color reading characteristic of the scanner 3, a color reproduction characteristic of recording paper and a color rxpression characteristic of recording ink to specify the correction coefficients (i.e., functions; masking equations) which provide a color reproduction characteristic most coincident with the foregoing characteristics. Based on the specified correction coefficients, the calculated values of the functions for respective values in a predicated range of 1-64 of the parameters R, G and B are memorized into the corresponding RAM's $16_1$–$16_3$.

After setting the optimum (coefficients of the) masking equations in accordance with the correction characteristic instruction data and then memorizing the calculated values of the functions constituting those equations into the RAM's $16_1$–$16_3$ as mentioned above, processing control can be proceeded in a similar logical manner to that in the embodiment of FIG. 11. The difference therebetween is only in that the ROM's are replaced by the RAM's.

In this embodiment, however, the Y conversion data for one line is obtained and stored into a line buffer memory 15y while the reading gradation data for one line is obtained. Then, the M conversion data for one line is obtained and stored into a line buffer memory 15m, and the C conversion data for one line is obtained and stored into a line buffer memory 15c. After that, the data in the line buffer memories 15y-15c are transferred to line buffer memories 16y-16c in an image recording unit 8 and, subsequently, reading of color information for the next line is started.

The microprocessor 18 serves as a main controller in the above processing, under control of which a timing signal generator 19 and a system controller 20 applies a timing signal and a control signal to the respective circuit elements.

Incidentially, a data selector 15 applies address buses of the microprocessor 18 system to the corresponding RAM's when the functional calculated data (17) are written into the RAM's $16_1$–$16_3$, applies the read data directly to address input terminals of the RAM's $16_1$–$16_3$ (and the line buffers 11r-11b) while the read data for one line is obtained from the image recording unit 2, and then serves as a switching gate for applying the read data to the address input terminals of the RAM's $16_1$–$16_3$ two times after the read data for one line has been stored in the line buffers 11r—11b.

Figure 13B:
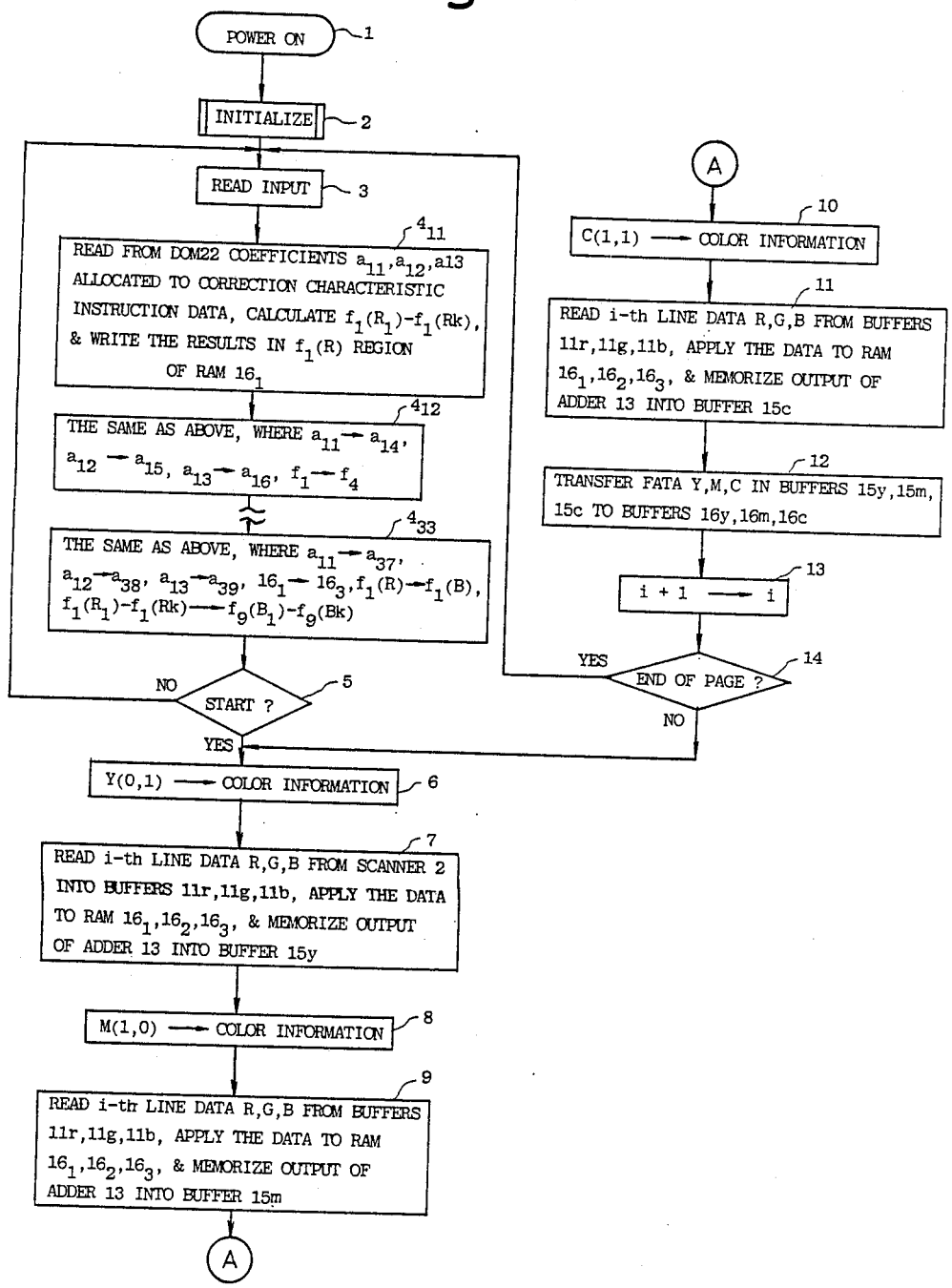

FIG. 13b shows the processing control operation for conversion of color information mainly effected by the microprocessor 18, and FIG. 13c shows the processing timings. The processing control will now be described with reference to these figures.

When powered on, the microprocessor 18 initializes the input/output port 23, internal registers, counters, timers, etc. (step 2 in FIG. 13b; hereinafter the word of step will be omitted in the parenthesis), and reads the input port 23 (3). In accordance with the correction characteristic instruction data applied to the input port 23, the microprocessor specifies the correction coefficients and hence the functions f1(R) to f9(B), calculates the functional values for respective values in ranges of R=1-64, G=1-64 and B=1-64, and then writes the calculated data into the RAM's $16_1$–$16_3$ based on the relationship between the block 17 and the RAM's $16_1$–$16_3$ shown in FIG. 13a ($4_{11}$ to $4_{33}$). Next, input reading is continued and the microprocessor waits for instruction of starting (5). If the content of the correction characteristic instruction data is changed while waiting, the steps $4_{11}$ to $4_{33}$ are executed correspondingly to calculate the new functional values and writes the results into the RAM's $16_1$–$16_3$ for update.

Upon instruction of starting (5), color information applied to (the address input terminals of) the RAM's $16_1$–$16_3$ is set to 01 indicative of yellow Y, the data selector 15 is set into such connection as to apply the output data from the reading unit 2 to the address input terminals of the RAM's $16_1$–$16_3$, and the distributor 14 is set into such connection as to apply the output data from the adder 13 to the line buffer 15y, thereby instructing the reading unit 2 to read the data for one line.

The gradation data output from the reading unit 2 are memorized in the line buffers 11r-11b, and the sum of the data read out of the RAM's $16_1$–$16_3$ accessed with the output data from the reading unit 2 (i.e., output of the adder 13) is memorized in the line buffer 15y (7). After receiving the gradation data for one line from the reading unit 2, the microprocessor 18 now processes such that color information applied to (the address input terminals of) the RAM's $16_1$–$16_3$ is set to 10 indicative of magenta M (8), the data selector 15 is set into such connection as to apply the read data from the line buffers 11r, 11g and 11b to the address input terminals of the RAM's $16_1$–$16_3$, the distributor 14 is set into such connection as to apply the output data from the adder 13 to the line buffer 15m to thereby read the gradation data out of the line buffers 11r-11b, and the sum of the data read out of the RAM's $16_1$–$16_3$ accessed with the above read data (i.e., output of the adder 13) is memorized in the line buffer 15m (9). Subsequently, color information applied to (the address input terminals of) the RAM's $16_1$–$16_3$ is set to 11 indicative of cyan C (10), the data selector 15 is left set into such connection as to apply the read data from the line buffers 11r, 11g and 11b to the address input terminals of the RAM's $16_1$–$16_3$, the distributor 14 is set into such connection as to apply the output data from the adder 13 to the line buffer 15c to thereby read the gradation data out of the line buffers 11r–11b, and the sum of the data read out of the RAM's $16_1$–$16_3$ accessed with the above read data (i.e., output of the adder 13) is memorized in the line buffer 15c (11). Then, the data in the line buffers 15y, 15m and 15c are transferred to the image recording unit 8. After the completion of this transfer, the content of the line counter register is incremented by one (13), and whether or not there comes at the end of page is judged from the content of the register (14). If there comes not at the end of page, the process subsequent to step 6 will be repeated in like manner as the above.

If there comes at the end of page, the microprocessor proceeds to the step of reading input (3) and executes the processing operation in like manner as the above in response to an instruction from the exterior.

FIG. 13c shows the time relationship of read and write of the data in the foregoing conversion processing on the color gradation information reading—recording information.

Also in this embodiment, the memory capacity required for the RAM's $16_1$–$16_3$ is as much as that required for the ROM's $12_1$–$12_3$ shown in FIG. 11, and hence relatively small. As described in the above, in this embodiment, since the coefficients of the masking equations are set in response to the correction characteristic instruction data, it becomes possible to perform appropriate conversion of color information in conformity with recording paper to be set, as well as the characteristics of ink and scanner.

According to the foregoing embodiments as described hereinabove, the color reproducibility is improved through conversion of color information using the equation of second or higher degrees. In addition, such conversion requires only relatively small memory capacity, and the needed hardware is mainly composed of a memory and an adder (which may be replaced by a microprocessor). As a result, the constitution is not especially complicated and the processing speed is relatively high.

In particular, the embodiment shown in FIG. 13a permits to selectively set the masking equations depending on a color reading characteristic of a scanner, color and a color reproduction characteristic of recording paper, and/or a color reproduction characteristic of a recording medium (such as ink or tonner), etc., thus making it possible to utilize the conversion of color information in still wider fields.

What is claimed is:

1. A method of processing a color image from scan to print comprising the steps of:
   scanning an original image as a series of image pixels;
   sensing the color of each pixel as a plurality of differing color components defined in a two-dimensional input coordinate system;
   assigning a color gradient to the sensed color for each pixel;
   transforming said plurality of color components to a new location within said two-dimensional coordinate system by altering the location coordinates of said color components in accordance with said assigned color gradient; and
   interrogating a look-up table with the transformed location coordinates to determine a printing gradation value and printing location coordinates allocated on a two-dimensional coordinate system assigned to each of a plurality of differing color components used to print the second image.

2. The method of claim 1, wherein the transformed location coordinates are obtained by adding 0.5 to each of the initial transfomred location coordinates and then rounding each location coordinate down to its nearest integer.

3. The method of claim 1, further comprising the steps of:
   generating a plurality of shifted positions for said transformed location coordinates, wherein the location coordinates in said shifted positions differ from said transformed location coordinates by less than one unit on said coordinate system;
   interrogating a look-up table with said shifted location coordinates to determine the shifted gradation values and shifted printing location coordinates on a two-dimensional coordinate system to be assigned to each of a plurality of differing color components used to print the scanned image;
   generating a mean value for the gradation values and printing location coordinates; and
   comparing said mean value with said printing gradation value and said printing location coordinate to verify the validity of said printing gradation value and said printing location coordinate.

4. The method of claim 3, wherein said shifted positions correspond to location coordinates positioned a distance equal to one unit in all directions on said two-dimensional input coordination system.

5. The method of claim 4, further comprising the steps of:
   measuring the distance from said shifted location coordinate to said shifted position along one of said two axes of said coordinate system to obtain a first complement;
   measuring the distance from said shifted location coordinate to said shifted position along the other of said two axes of said coordinate system to obtain a second complement;
   multiplying said shifted gradation values and said shifted location coordinates by the related first and second complements to obtain a plurality of weighted threshold values;
   generating a mean value for the plurality of weighted threshold values; and
   comparing said mean value with said printing gradation value and said printing location coordinate to verify the validity of said printing gradation value and said printing location coordinate.

6. The method of claim 1, further comprising the steps of:
   defining 16 groups of coordinates adjacent to at least one of said transformed color components;
   detecting distances between each of said 16 groups of coordinates and said transformed color component;
   interrogating a look-up table with said 16 groups of coordinates to determine the gradation values and printing location coordinates on a two-dimensional coordinate system to be assigned to each of said 16 groups of coordinates for printing the scanned image;

generating a mean value for the gradation values and printing location coordinates; and comparing said mean value with said printing gradation value and said printing location coordinate to verify the validity of said printing gradation value and said printing location coordinate.

7. A color image processing method wherein:

R represents the red gradation component obtained from scanning an image;

G represents the green gradation component obtained from scanning said image;

B represents the blue gradation component obtained from scanning said image;

Y represents the yellow gradation component for printing said image;

M represents the magenta gradation component for printing said image;

C represents they cyan gradation component for printing said image;

said processing method comprising the steps of:

obtaining each printing gradation component by solving the following equations:

$$Y = f1(R) + f2(G) + f3(B)$$

$$M = f4(R) + f5(G) + f6(B)$$

$$C = f7(R) + f8(G) + f9(B)$$

where f1(R), f2(G), f3(B), f4(R), f5(G), f6(B), f7(R), f8(G) and f9(B) are functions of second or higher degrees;

calculating calculation values of said functions f1(R), f2(G), f3(B), f4(R), f5(G), f6(B), f7(R), f8(G) and f9(B) for predetermined ranges of parameters, R, G and B in advance individually, and storing said calculated values in memory corresponding to the respective parameter values separately as to said functions; and accessing said memory with R, G and B as parameters to read the corresponding calculated values to thereby obtain Y from addition of the calculated values of f1(R), f2(G) and f3(B), M from addition of the read calculated values of f4(R), f5(G) and f6(B), and C from addition of the read calculated value of f7(R), f8(G) and f9(B).

* * * * *